June 2, 1936.  E. D. SIMONS  2,042,866

FASTENER ATTACHING DEVICE

Filed Dec. 15, 1934

INVENTOR
Ernest D. Simons,
BY
Fraser, Myers & Manley
ATTORNEYS.

Patented June 2, 1936

2,042,866

UNITED STATES PATENT OFFICE 2,042,866

FASTENER-ATTACHING DEVICE

Ernest D. Simons, Waterbury, Conn., assignor to Scovill Manufacturing Company, Waterbury, Conn., a corporation of Connecticut Application December 15, 1934, Serial No. 757,663

1 Claim. (Cl. 24—208)

This invention relates to improvements in capped eyelets adapted for use as attaching elements of metal fasteners such as are commonly used in the making of wearing apparel and other articles of manufacture.

It is an object of the invention to provide a one-piece combined fastener cap and eyelet having all the meritorious features of the ordinary one-piece eyelet with a simple flat flange and the two-piece eyelet having a cap with a rolled margin, at an expense not materially exceeding that of the ordinary flat-flange, one-piece eyelet.

In the accompanying drawing illustrating preferred forms of the above-described invention,—

In the form of the invention illustrated by Figs. 1 to 4, inclusive, 20 is an eyelet having a cap 21 which, preferably, may be slightly rounded as indicated, and the cap has its marginal portion 22 rolled downwardly, inwardly and upwardly so as to have a smoothly rounded periphery.

Figure 1:
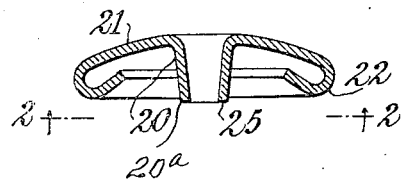
Figure 1 is a transverse cross-sectional view of a combined fastener cap and eyelet having the invention embodied therein.
Figure 2:
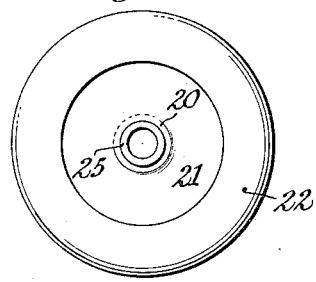
Fig. 2 is a plan view of the fastener element illustrated by Fig. 1 as it would appear when viewed in the direction indicated by the arrows.

The combined eyelet and cap, one form of which is illustrated by Figs. 1 and 2, may be used as a substitute for any of the well-known self-piercing eyelets of the prior art and for any purpose for which such eyelets have been used. As clearly indicated by Fig. 3 of the drawing, the eleyet may be used as an attaching element for a well-known type of snap fastener socket 23. When so used, the eyelet and the socket are applied to opposite surfaces of the sheet of material 24 to which they are to be secured and forcibly pressed towards each other by any suitable attaching implement or machine. As the two parts of the fastener are thus forced towards each other from opposite sides of the intervening material, the material is pierced by the forward end 25 of the eyelet, which is of substantially the same diameter as the opening 26 provided therefor in the socket; after which the end portion of the eyelet 20 passes through the opening in the socket and is rolled outwardly and clinched therein, as at 27, by the attaching implement or machine in the usual manner. The portions of the sheet material 24 immediately surrounding the eyelet may be firmly compressed between the rounded marginal portion 22 of the eyelet cap and an outwardly-turned flange 28 of the fastener element.

Figure 4:
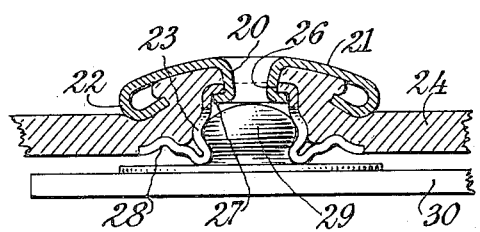
Fig. 4 is a view, partly in transverse cross section, of the snap fastener stud and socket illustrated by Fig. 3, the parts being indicated as having been snapped into their engaging relations.
Figure 3:
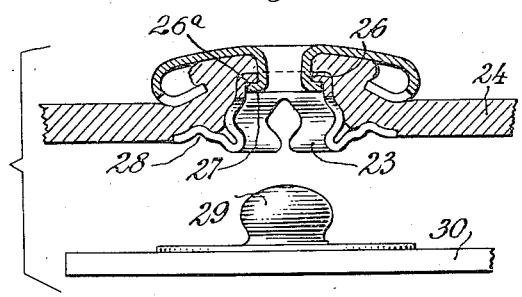
Fig. 3 is a transverse cross-sectional view of a snap fastener socket and an attaching cap and eyelet embodying the invention, secured together against opposite surfaces of a piece of fabric. In this figure is also illustrated in side view another piece of fabric with an attached stud adapted to be inserted in the snap fastener socket.

The snap fastener socket illustrated by Fig. 3 is adapted to receive any conventional type of fastener stud, one of which is represented at 29 as having been secured to a piece of sheet material 30, which may be detachably attached to the sheet material 24 by snapping the stud 29 into the socket 23 to the position indicated in Fig. 4, in which the two parts of the fastener element are represented in their engaging relation.

The end 25 of the eyelet 20 and the portion 26 of the socket 23 into which the eyelet is inserted by the attaching mechanism may be of such forms and may have their edge portions sufficiently sharpened as indicated at 20 (a), Fig. 1, and 26 (a), Fig. 3, to cause the fastener to function as one of the well-known self-piercing type, thus requiring no previous perforation of the sheet material prior to the application of the fastener. This feature of a fastening element is well known in the prior art and constitutes of itself no part of the invention herein to be claimed.

Figure 6:
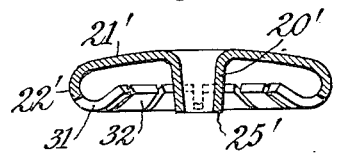
Fig. 6 is a transverse cross-sectional view of the fastener element illustrated by Fig. 5, the section being taken along the line 6—6 and viewed in the direction indicated by the arrows.
Figure 5:
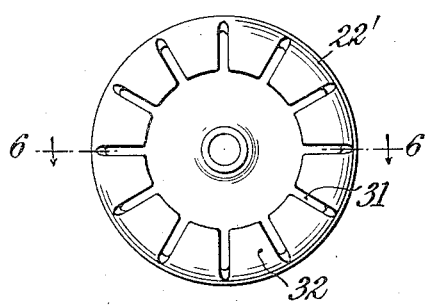
Fig. 5 is a plan view of a cap and eyelet embodying a modified form of the invention.
Figure 7:
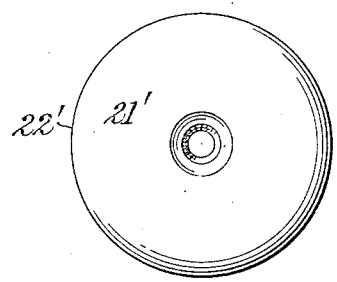
Fig. 7 is a plan view of the face of the fastener opposite that illustrated by Fig. 5.

In Figs. 5, 6 and 7 is illustrated a modified form of the invention, which differs from the form illustrated by Figs. 1 and 2 in that the combined cap and eyelet is represented as having been made from a blank the edge of which is serrated by a plurality of radial slits before being rolled to produce the rounded edge 22'. After the rolling of the marginal portion of the blank to form the rounded edge, the portions between the slits 31 (Fig. 5) appear as a circumferential series of spaced, inwardly and upwardly turned fingers 32. The eyelet barrel 20' and the end portion 25' of the eyelet may be substantially identical with the corresponding parts of the attaching element illustrated by Figs. 1 and 2.

The form of cap and eyelet illustrated by Figs. 5, 6 and 7 serves every purpose which may be served by the eyelet illustrated by Figs. 1 and 2, but the slitting of the periphery of the blank before rolling its marginal portion somewhat facilitates the working of the metal during the bending operation.

Self-piercing eyelets have for many years been made and used having a simple, flat, outwardly-turned flange with a relatively sharp, outer edge, and two-piece capped eyelets have for many years been made and used, the cap being superimposed over the flanged end of the eyelet with its marginal portion rolled down and in under the periphery of the eyelet flange; but, notwithstanding this long and extensive use of the simple one-piece eyelet having an outwardly-turned flange with a sharp edge, and the two-piece eyelet having a rolled or rounded edge, apparently no one has ever before conceived of the idea of producing the herein-disclosed simple and relatively inexpensive one-piece combined eyelet and cap embodying substantially all the meritorious features of the two above-described eyelets of the prior art. The rounded periphery of the attaching element presents the enhanced appearance of the two-part fastener of the prior art and at the same time avoids the objectionable feature of the sharp flanged eyelet of the prior art, which has a tendency to cut and wear the material immediately surrounding the flange where the material is caused to be bent over such sharp edge as the parts of the fastener are successively engaged with each other and disengaged during use.

The invention is not intended to be limited to the specific features of either of the forms of the invention herein used for purposes of illustration, but should be regarded as including modifications and variations thereof within the scope of the appended claim.

What is claimed is:—

A fastener-attaching device consisting of a central, substantially cylindrical eyelet barrel and an integral, crowned cap extended outwardly from one of its ends and having its marginal portion rolled to form an inturned, rounded edge, concentric with and surrounding the barrel, so as to be adapted to be held in snug contact with one surface of the material to which a complemental fastener element may be secured by the attaching device, the length of the barrel being approximately equal to the axial depth of the cap and its free end being of an external diameter substantially equal to the internal diameter of an opening in the complemental fastener element, between which and the rounded marginal portion of the cap of the attaching device the material to which the fastener is to be attached may be clamped.

ERNEST D. SIMONS.